(12) United States Patent
Rubinstein et al.

(10) Patent No.: US 7,023,809 B1
(45) Date of Patent: Apr. 4, 2006

(54) INTELLIGENT CONCENTRATOR USAGE

(75) Inventors: Alan Rubinstein, Fremont, CA (US); Gary Wang, Cupertino, CA (US)

(73) Assignee: 3Com Corporation, Santa Clara, CA (US)

( * ) Notice: Subject to any disclaimer, the term of this patent is extended or adjusted under 35 U.S.C. 154(b) by 472 days.

(21) Appl. No.: 09/922,995

(22) Filed: Aug. 3, 2001

Related U.S. Application Data

(60) Provisional application No. 60/285,419, filed on Apr. 20, 2001, provisional application No. 60/277,767, filed on Mar. 20, 2001, provisional application No. 60/277,593, filed on Mar. 20, 2001, provisional application No. 60/277,592, filed on Mar. 20, 2001, provisional application No. 60/277,451, filed on Mar. 20, 2001, now abandoned.

(51) Int. Cl.
*G06F 11/00* (2006.01)
*G01R 31/08* (2006.01)
*H04J 1/16* (2006.01)
*H04L 12/26* (2006.01)

(52) U.S. Cl. .................. 370/241; 370/536; 370/537; 370/542; 370/532; 370/533; 370/534; 370/535; 370/442

(58) Field of Classification Search .............. 370/352, 370/401, 353, 469, 490, 536, 537, 542, 532, 370/533, 534, 535, 442, 400, 260, 241, 242, 370/248, 250; 340/310.01–310.06, 333, 340/310.07, 533, 538, 541, 452.2, 538.11, 340/870.18, 870.19, 870.31; 455/425.2, 455/522; 713/300, 310; 375/257; 709/224
See application file for complete search history.

(56) References Cited

U.S. PATENT DOCUMENTS

| 5,805,597 | A |   | 9/1998  | Edem ......................... 370/445 |
|-----------|---|---|---------|----------------------------------------|
| 6,085,243 | A | * | 7/2000  | Fletcher et al. ............. 709/224   |
| 6,154,465 | A | * | 11/2000 | Pickett ....................... 370/466 |
| 6,181,694 | B1| * | 1/2001  | Pickett ....................... 370/353 |
| 6,275,144 | B1| * | 8/2001  | Rumbaugh ............. 340/310.01       |
| 6,389,009 | B1| * | 5/2002  | Pickett ....................... 370/352 |
| 6,496,103 | B1| * | 12/2002 | Weiss et al. ........... 340/310.01     |
| 6,522,626 | B1| * | 2/2003  | Greenwood ................. 370/208     |
| 6,539,027 | B1| * | 3/2003  | Cambron .................... 370/442    |
| 6,686,832 | B1| * | 2/2004  | Abraham ............... 340/310.01      |
| 2002/0181044 | A1| * | 12/2002 | Kuykendall ................. 359/124  |

* cited by examiner

*Primary Examiner*—Wellington Chin
*Assistant Examiner*—Chuong Ho

(57) ABSTRACT

The present invention relates to a computer network and a method for using the network The network and method employ powered multiplexing connection devices which electronically couple two or more network devices to the network. The signals from the network devices to the network are multiplexed at the powered multiplexing connection devices and the signals from the network to the network devices are demultiplexed at the powered multiplexing connection devices. The multiplexing enables the various work-center devices to communicate with the network and, in some cases, to receive power over the network connection. The intelligent electronic circuitry is also capable of aiding in network security and management and in monitoring the status of the network infrastructure. A primary advantage of the disclosed invention is an enormous reduction in the network administrator's workload in that a significant portion of the labor involved in managing and modifying a network is alleviated or obviated by the powered, intelligent, multiplexing connection devices.

19 Claims, 6 Drawing Sheets

INTELLIGENT CONCENTRATOR USAGE

RELATED U.S. APPLICATIONS

This application claims priority to the commonly-owned co-pending provisional patent applications: patent application U.S. Ser. No. 60/277,593, entitled "'INTELLIJACK' PHYSICAL CONCEPTS," filed Mar. 20, 2001, and assigned to the assignee of the present invention; patent application U.S. Ser. No. 60/277,767, entitled "A METHOD FOR MANAGING INTELLIGENT HARDWARE FOR ACCESS TO VOICE AND DATA NETWORKS," filed Mar. 20, 2001, and assigned to the assignee of the present invention; patent application U.S. Ser. No. 60/277,451, entitled "A METHOD FOR FILTERING ACCESS TO VOICE AND DATA NETWORKS BY USE OF INTELLIGENT HARDWARE," filed Mar. 20, 2001, and assigned to the assignee of the present invention; patent application U.S. Ser. No. 60/277,592, "'INTELLIJACK' USAGE," filed Mar. 20, 2001, and assigned to the assignee of the present invention; and patent application U.S. Ser. No. 60/285,419, "INTELLIGENT CONCENTRATOR," filed Apr. 20, 2001, and assigned to the assignee of the present invention.

FIELD OF THE INVENTION

The present invention relates to the field of Local Area Networking (LAN). More specifically, the present invention relates to a system and method for efficiently multiplexing data, voice, FAX and power lines between the work site and the network.

BACKGROUND OF THE INVENTION

The infrastructure of a modern Local Area Network (LAN) is generally accomplished by extensive runs of multiple parallel cables to multiple connections and devices at each work site, all connected to one or more central hubs. This is in addition to VOIP-enabled voice telephone, digital FAX, and device power cabling that can also be required to support the modern work center. When LAN infrastructures require change, it is generally more efficient to leave existing cables in place and simply string new cables between switch and router nodes and any new work-site devices.

For example, the use of Category 3 cabling is commonplace in computer networks. Cat. 3 cabling is configured to support 10 MB Ethernet connections. If a site, previously wired with Cat 3 cabling to support 10 MB Ethernet, developed a need to upgrade to 100 MB Ethernet, a new set of cables (Cat 5 or better) would have to be run from the central router or hub out to the work center where the 100 MB service was required.

The current state of the art for implementing data multiplexing and Firewall technology, on a per user basis, is centered around providing the capability in a centralized head end data switch or router or by distributing these functions to the end user's location by placing a box level data concentrator switch and security equipment, whether hardware firewall, access control or hardware encryption device, next to the computing equipment that is to be connected to a data LAN.

Current distributed solutions are ad hoc, of questionable reliability, inefficiently managed and subject to failures caused by accidental removal of power and wire breakage. Current solutions require local power which adds an installation requirement and reduces system reliability. Security could be breached through intentional or inadvertent bypassing of any installed Firewall. Software solutions are hard to deploy and maintain in the field and once installed are subject to attacks through common hacking techniques. An additional weakness of software solutions is that the device that is to be networked may not be able to host the required software.

What is needed, then, is a means of reliably multiplexing VOIP (voice over internet protocol), data, FAX and power lines in order to reduce the cost of installation and infrastructure change in a LAN. Furthermore, such a means should provide information about usage and should facilitate the management and security of the network.

SUMMARY OF THE INVENTION

Presented herein is a method of using a computer network that employs a powered, intelligent, multiplexing, connection device, known as an Intelligent Concentrator, as a means of reliably multiplexing VOIP phone, data, FAX and power lines in order to reduce the cost of installation and infrastructure change in a LAN. Furthermore, the connection jack provides information about usage and facilitates the management and security of the network.

The present invention relates to a computer network and a method for using the network. The network and method employ powered multiplexing connection devices which electronically couple two or more network devices to the network. The signals from the network devices to the network are multiplexed at the powered multiplexing connection devices and the signals from the network to the network devices are demultiplexed at the powered multiplexing connection devices. The multiplexing enables the various work-center devices to communicate with the network and, in some cases, to receive power over the network connection. The intelligent electronic circuitry is also capable of aiding in network security and management and in monitoring the status of the network infrastructure. A primary advantage of the disclosed invention is an enormous reduction in the network administrator's workload in that a significant portion of the labor involved in managing and modifying a network is alleviated or obviated by the powered, intelligent, multiplexing connection devices.

Embodiments of the present invention disclose a computer network and a method for using the network that employ powered, intelligent, multiplexing connection devices, also known as Intelligent Concentrators. Disclosed is a computer network which comprises one or more work centers each of which comprises work center devices as well as cabling, one or more network servers and one or more powered, intelligent, multiplexing devices located at the work centers. All of the devices in the network are electronically coupled with the work center devices being electronically coupled through the powered, intelligent, multiplexing devices. The signals between the work center devices and the network servers are multiplexed in the network cables.

BRIEF DESCRIPTION OF THE DRAWINGS

The operation of this invention can be best visualized by reference to the drawings.

Figure 1:
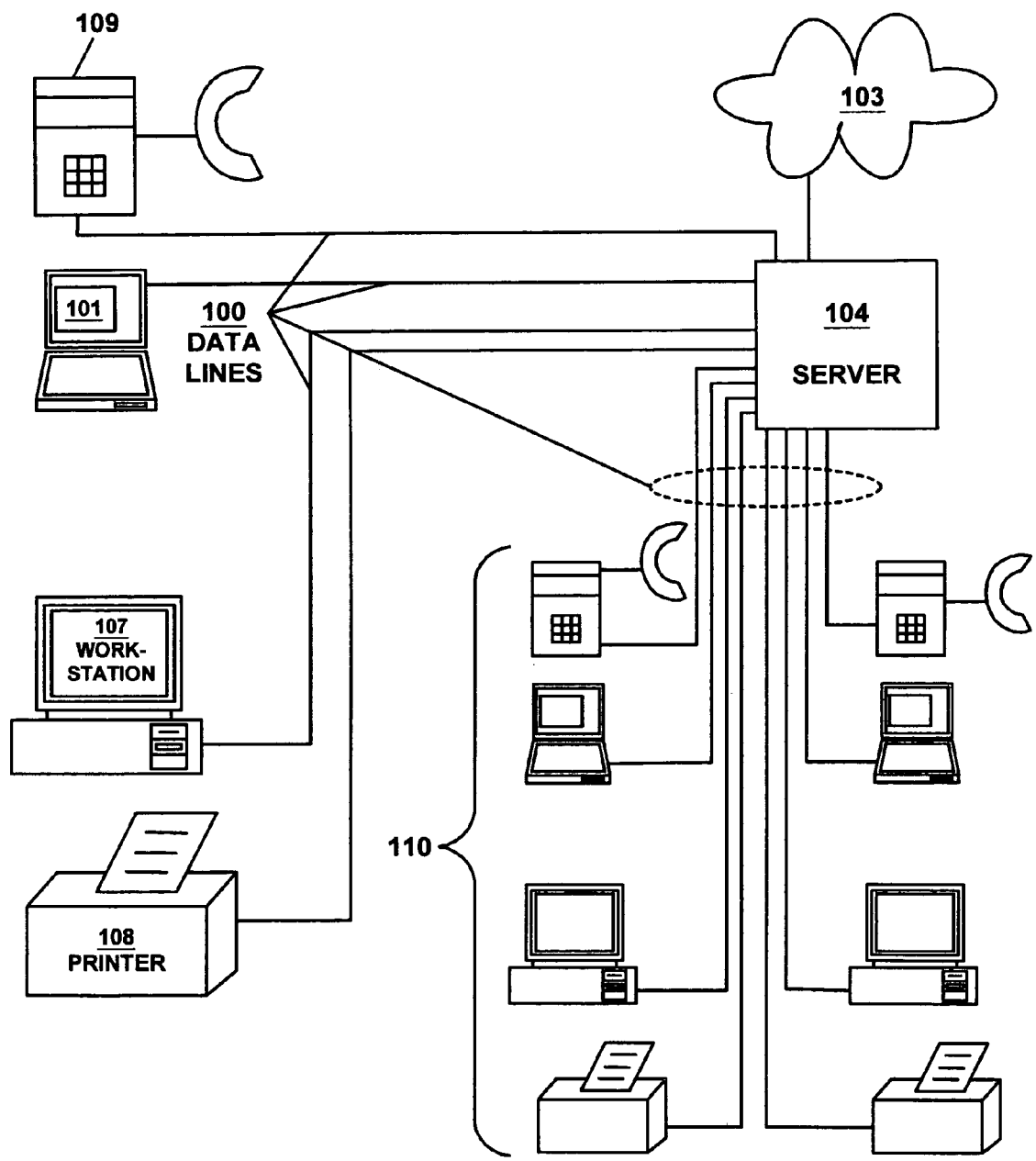
FIG. 1 (Prior art) illustrates a conventional LAN implemented with a server and work centers.

The drawings referred to in this description should be understood as not being drawn to scale.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on signals within an electronic circuit. These descriptions and representations are the means used by those skilled in the electronic arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in an electronic system.

There are many conceivable embodiments of the present invention. However, the concepts underlying the present invention may be best understood by the discussion of only a few embodiments. This discussion in no way limits the application of the concepts nor determines the limit to embodiments possible.

This embodiment of the present invention employs intelligent hardware that is easy to install and reliably provides an attachment point for access to Voice & Data Networks. The embodiment is implemented by the employment of miniaturized hardware that could be installed inside a wall or in an internal space provided for in an office cubicle. One surface of the hardware device employed by this embodiment is intended to be accessible by the work center end user and would, in most instances, be on an external surface of a workspace.

In one embodiment, several standard communications jacks, such as RJ45, as well as status indicator lights, are mounted on the external, user accessible, surface of the hardware device. One expected implementation would provide modular connectors such as RJ-45 communication jacks. However, alternative implementations could support a different form of connection.

Connections to a central data network (LAN) or voice telephone network (or perhaps dedicated FAX lines) in the present embodiment would be terminated at the connection apparatus. These connections would be established by an installer and would not be intended to be accessible by the end user. In most instances, the wiring between the unit and the communications infrastructure would terminate inside the wall. Termination of the network wiring (VOIP or data) would provide for both a reliable electrical and mechanical connection for industry standard communications cabling such as CAT3, CAT5 or CAT5E or similar cabling. It is envisioned that the integrity of the installation may utilize mounting hardware such as screws or snap fit techniques that could not removed by an end user without specialized tools.

In addition to terminating cable connections, this embodiment of the present invention could support management and use of analog as well as digital telephone connections. In the intended implementation, a powered, intelligent, multiplexing, connection device, also known as an intelligent concentrator, or other connector could be configured to provide either a LAN data connection or an analog telephone connection. The end user would be able to insert a data cable or a telephone into a jack and either device could be supported. The end user would not have to actively configure or program this embodiment to enable either mode of operation. Support for a separate direct termination of a cable to a separate sub-net could also be provided.

In addition to wired connections, this embodiment could also employ wireless connectivity. Standard communication media such as IR, BlueTooth, 802.11 or other means could be utilized to communicate with the intelligent concentrator that this embodiment of the present invention uses.

Power for work center devices used in this embodiment and for the intelligent concentrator itself could be provided from a central source over the network cabling. Some devices employed with this embodiment would also be able to forward power to data devices connected to the communications jacks on the user accessible surface of the intelligent concentrator. The power that is provided could be connected in a manner that would isolate the effect of electrical faults due to component failures or shorts in the connected device or the wires to it. Such isolation, in conjunction with a current limiting capability, could prevent a failure external to the powered, multiplexing, intelligent concentrator from damaging it and would isolate the failure in a way that would allow the intelligent concentrator itself, and devices that are connected to it in this embodiment, to remain operational. Current limiting could be part of the implementation of the network management advantages of this embodiment. Recovery of the effected port would be automatic and could occur as soon as the failed device or wire is removed or the embedded intelligence in the intelligent concentrator could sense the condition and report it to a central management console. This embodiment would implement this feature with current limiting fold back circuitry internal to the intelligent concentrator. Another implementation is through self-healing "Poly Switch" fuses.

The benefits that accrue from the physical mounting of the intelligent concentrator in the manner already described would add significantly to the functionality, reliability and the range of functions that could be performed by this embodiment. Installations that do not provide for the termination of the wiring to the network internal to a protected surface such as a wall or a cubicle are inherently unreliable and are subject to a degrading of connections from mechanical stress, abrasion and related mechanisms. The placement of attachment points in a protected environment would eliminate problems from accidental stresses that could occur. Mechanical stress could occur if a user were to snare a device cable and inadvertently pulled on the embodiment, either directly or through the attached cable. The mounting hardware would isolate the forces to which the wiring is subjected.

Another benefit of the physical attributes necessary to this embodiment that has been described is that the end user does not have direct access to the network infrastructure. This embodiment would allow use of physical devices, such as the powered, multiplexing, intelligent concentrator, to serve as managed access control points. If this embodiment were enabled by another implementation of the intelligent concentrator, such as a stand alone box, the end user might be able to circumvent the functions allowed by this embodiment and could gain direct, unmanaged, access to the network. It is apparent that concepts presented in this embodiment of the present invention provide an added degree of security by presenting a controlled point of access. An additional security benefit of this embodiment is the ability to implement some form of tamper alert signal that could be automatically sent to network management in the event of a physical breach.

For wireless connectivity, devices employed in this embodiment could use an antenna or an IR port that would communicate through a device built into the face of the intelligent concentrator. It would be expected that the intelligent concentrator would contain the electronics suite that would provide the additional supporting circuitry to implement a wireless connection.

Another significant advantage offered by this embodiment is the provision of a degree of directionality that could be optimized to limit the number of devices, both intended and unintended, with which any unit would be able to communicate. By employing directionality and shielding, the occupant of a workspace would be able to reliably communicate with the unit while another person in an adjacent space using similar equipment would be less likely to interfere with or even gain access to the first user's communication. Some of this access control, in this embodiment, could be implemented and managed from the network administrator's console.

It is envisioned that this embodiment of the present invention would require intelligent concentrators that were implemented as separate elements. A base unit could contain the capability to terminate cabling while a separate unit containing intelligent electronics could be added to the base unit at a later time. The functional split of such a unit in this manner would allow for wide deployment of network wiring infrastructure in a cost effective manner since the cost of the intelligence would not be borne for work areas that might not currently be occupied. Other benefits that derive from this type of functional partitioning is in the area of field service and upgrades. A unit that was suspected to have failed could quickly be replaced and retested. Also, newer units with added capabilities could be added where needed and older modules could still be used in areas where the added capabilities were not needed.

It is also envisioned that a modular expansion capability could be employed in this embodiment to enable the functions of deployed units to be readily adopted to new and varying needs. An expansion module could obtain bus signal and power from the network. Serial buses such as USB or Ethernet could be suitable for this purpose. The implementation of a modular add-on could be implemented in a fashion so the end user would not view the bus expansion connector as a general purpose interface as would be the case with a PC. This would be done to avoid problems that could arise if end users inserted cables directly into industry standard expansion connectors, expecting to enable the functions provided by a peripheral device. This limiting of supported capabilities is anticipated since the on-board intelligence might not be implemented with the capability of detecting the characteristics of a connected device. There also would not necessarily be an easy means to add the required software elements nor a user interface to support the level of communications with an end user that some peripherals require.

A further understanding of the concepts presented in this discussion of this embodiment of the present invention may be had by reference to the attached Figures. Prior art FIG. 1 illustrates a conventional LAN implemented with a server and three work centers. A work center might be populated with a workstation 107, a network printer 108, a laptop 101 or other devices and combinations of devices that require direct communication with the server in order to function properly. Additionally, a voice telephone, 109, using Voice Over Internet Protocol (VOIP) technology, might be in the modern workplace. Each of these devices requires a cable connection to the server or to its peripheral switching mechanisms. As discussed earlier, each of these connections currently requires a separate cable run which can be very expensive and can compromise system integrity and security.

Figure 2A:
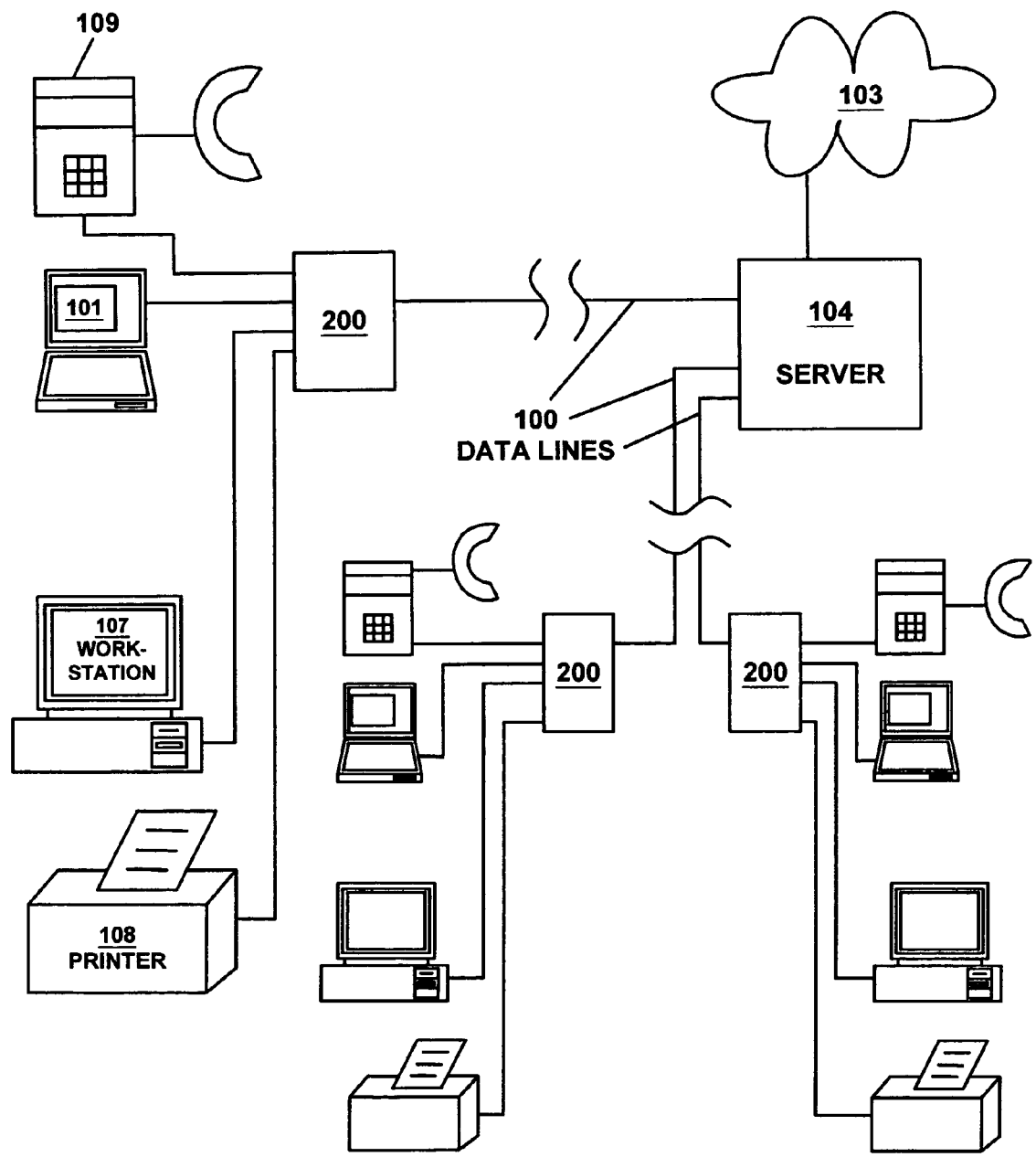
FIG. 2A illustrates a LAN, configured in accordance with one embodiment of the present invention.

FIG. 2A illustrates a LAN, configured with the same equipment as in FIG. 1, where the work area equipment has been connected to the network via embodiments of the present invention, which can be called smart network portals, powered, intelligent, multiplexing, connection devices or Intelligent Concentrators, 200. All of the same functions and devices of the previous work centers are represented but, using intelligent concentrators, a single cable is all that is required to connect the work area equipment suite with the server. VOIP telephone 109 is implemented as well in the equipment array.

Figure 2B:
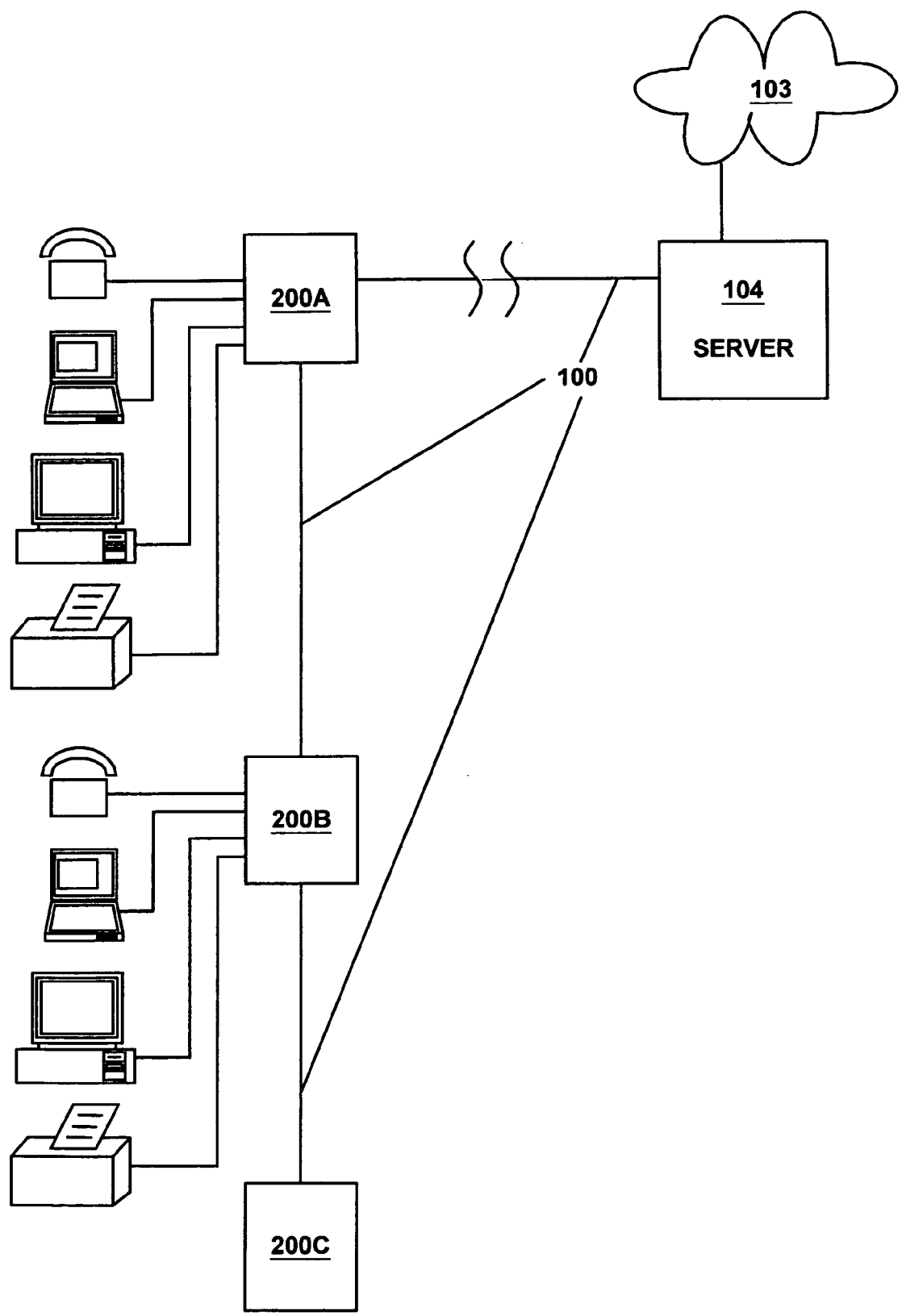
FIG. 2B illustrates a variation on a LAN enabled in accordance with embodiments of the present invention.

FIG. 2B illustrates a variation on the LAN equipped with intelligent concentrators. Here, a further reduction in cabling cost is gained by the use of a "daisy-chained" arrangement of intelligent concentrators, 200A, 200B and 200C. A daisy-chain would result in only one cable being connected directly to the server, or to its peripheral switching center, to connect a plurality of work centers. In the illustration shown, intelligent concentrator 200C is shown without connection to any work center devices. It could be employed in this condition as a line testing device or other device to assist the network administrator in network management. Such a device could be implemented with a stand alone line tester or other device that would supplant the need for a human tester at the cable terminus.

It is expected that some embodiments of the present invention could be implemented with fully enabled intelligent concentrators, providing a means of network administration workload reduction in a daisy-chain configuration. This would reduce even further the network management workload.

Figure 2C:
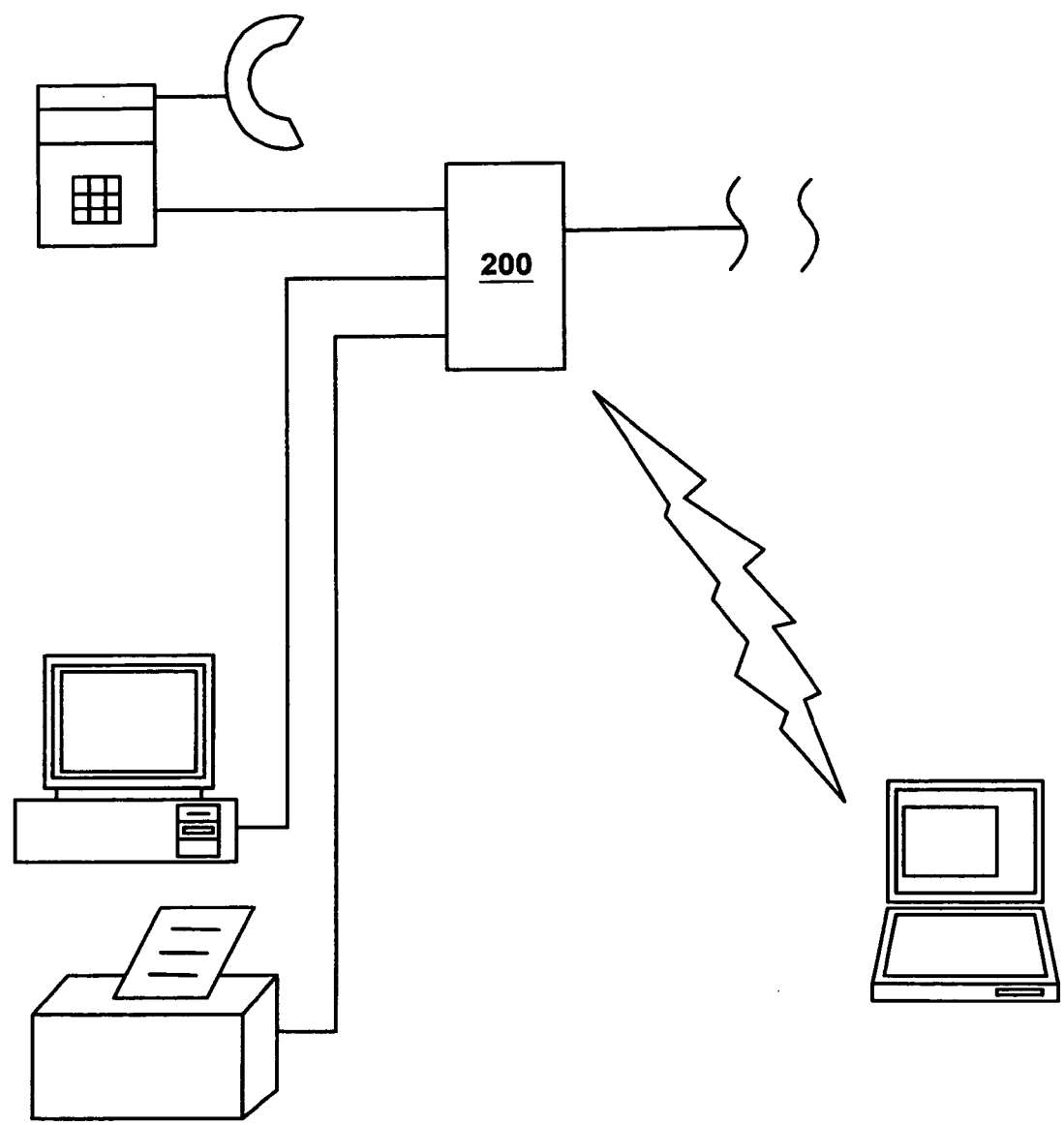
FIG. 2C illustrates yet another variation on a LAN enabled in accordance with embodiments of the present invention.

FIG. 2C illustrates a possible layout of a work center in accordance with this embodiment of the present invention. In this illustration, in addition to a desktop computer, printer and VOIP-enabled phone, there is a laptop shown communicating with an intelligent concentrator by means of wireless communication. As was discussed earlier, wireless communication could be employed by devices using IR, Bluetooth, or any other communication standard.

Figure 3:
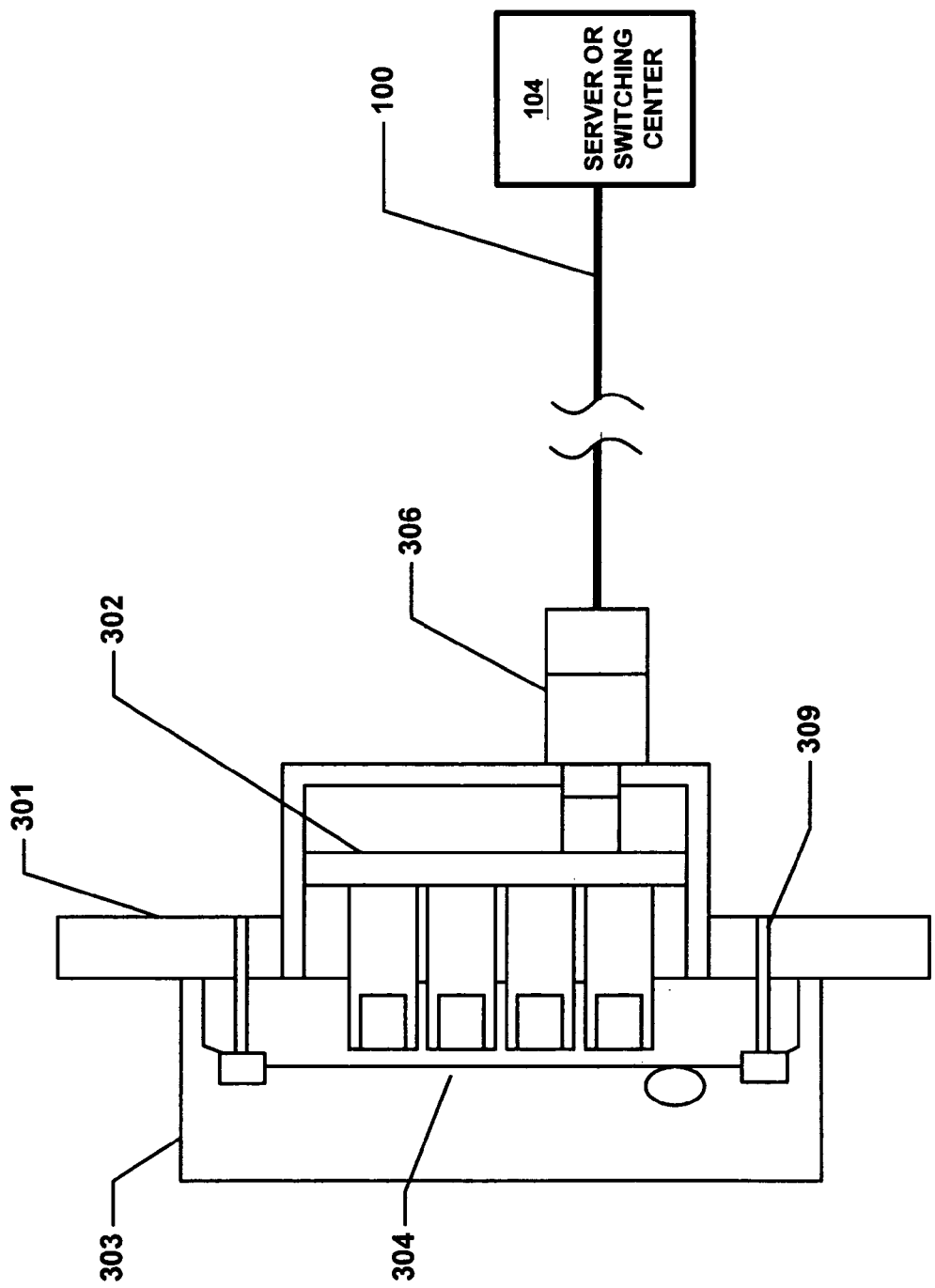
FIG. 3 illustrates a possible configuration of an Intelligent Concentrator in accordance with one embodiment of the present invention.

FIG. 3 illustrates a possible configuration for an powered, intelligent, multiplexing, Intelligent Concentrator as could be employed by this embodiment of the present invention. Intelligent concentrator 301 is shown in side cutaway view, with connector jacks 304 and wireless device 307 shown in one of several conceivable arrangements. Wireless communication device 307 is envisioned as being enabled in a variety of protocols. Infrared and Bluetooth, or some other RF implementation, are possibilities. Multiplexing of signals to and from server 104 would very likely be under the control of in-unit electronics 302. Again, those signals and possible power for some devices, would travel over single cable 100 and connect to intelligent concentrator 301 via back-of-unit connector 306.

Also shown in FIG. 3 is add-on device 303. A range of possibilities exists for the functions of device 303. It could be implemented as an intelligent remote testing device, allowing the network infrastructure and cabling to be tested and evaluated from a central location, without any action being required at the work site. Device 303 might also be implemented as a security device, preventing physical attachment to the LAN cabling without a notification being sent to the server that the physical network port as been compromised. Such a notification could be the previously discussed tamper alert or security breach notification.

Figure 4:
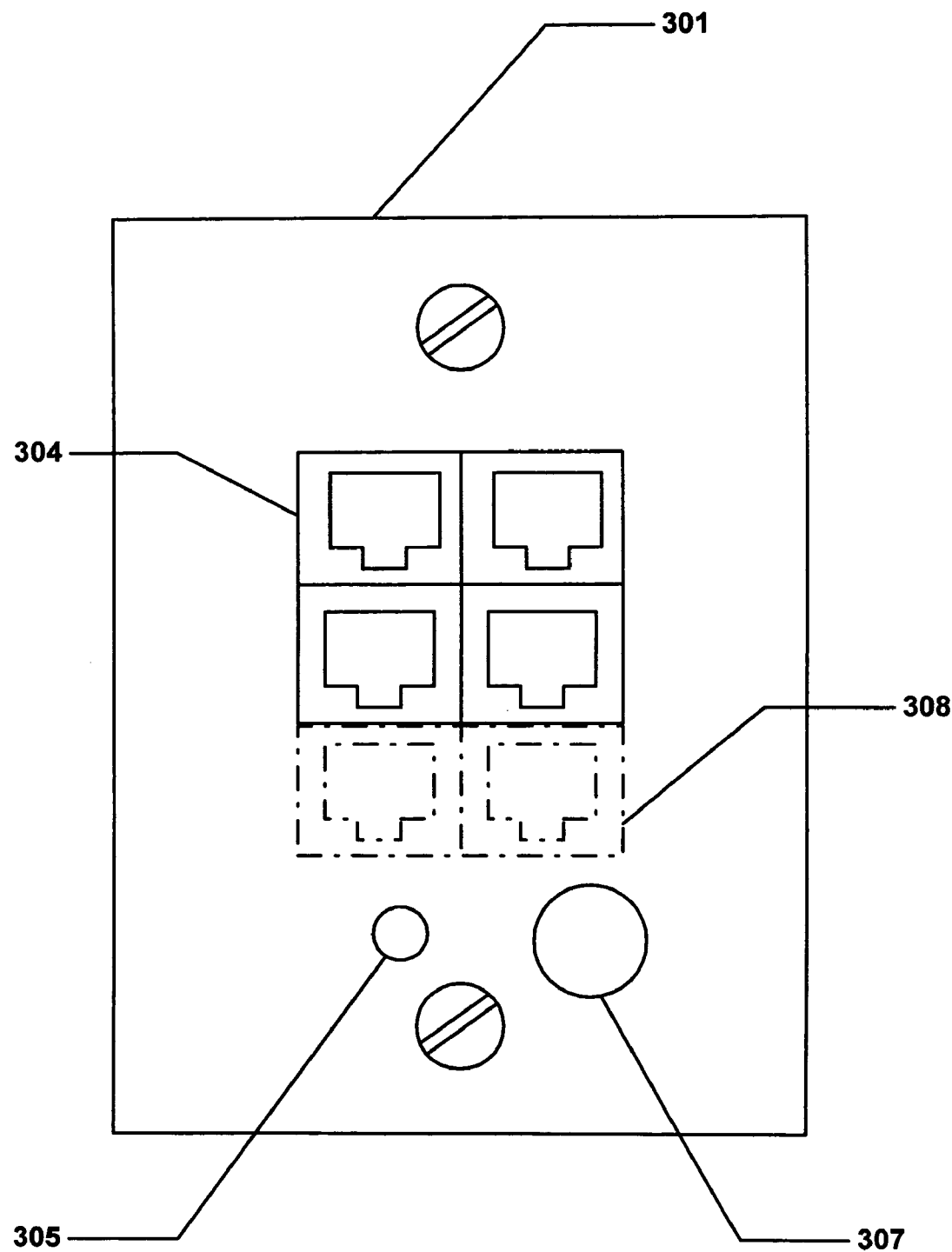
FIG. 4 illustrates a possible configuration of an Intelligent Concentrator in accordance with one embodiment of the present invention.

FIG. 4 illustrates a possible configuration for an embodiment of an intelligent concentrator that could be employed by this embodiment of the present invention. Intelligent concentrator 301 is shown here with four RJ-45 jacks, 304. There is space, even if such an implementation takes the form factor of a standard wall plate device, for more jacks, 308. These other jacks could enable a parallel connection to a different network or to a telephone system or to a number of other envisioned possibilities. FIG. 4 also shows status indicator light 305 which could be implemented in a possible embodiment.

Also shown in FIG. 4 is wireless communication device 307. Device 307 could be implemented in any number of wireless standards for non contact connection to the network. Again, infrared or an RF protocol, such as Bluetooth, are possible communication standards that come to mind. The necessary transceiver electronics for device 307 are likely to be contained in the body of intelligent concentrator 301, possibly integral with internal electronics 302. Some RF protocols might allow the utilization of an internal antenna, obviating the need for a disruption of the device form factor. An infrared or other protocol may require the use of an external antenna as alluded to at 307.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

This embodiment of the present invention employs intelligent hardware that is easy to install and reliably provides an attachment point for access to Voice & Data Networks. The embodiment is implemented through miniaturized hardware that can be installed inside of a wall or in internal space provided for in an office cubicle. One surface of this embodiment is intended to be accessible by the end user and would in most instances be on an external surface of a workspace.

This embodiment of the present invention distributes elements of the network infrastructure such as the switches, HUBs or similar multiplexing technology out to the end of a network drop close to the target client devices. The client devices may be located in private areas such as an office cubicle/workspace or in public spaces such as conference rooms, lobbies or even in mobile settings such as trains or airplanes. The network traffic generated by the client devices or directed to them are carried over the shared capacity of a single network drop which allows growth to be accommodated without having to incur the cost and delays associated with adding additional physical network connections (cable and head end line cards for the switches, Hubs or routers. This embodiment of the present invention is implemented using industry standard Ethernet technology over star connected twisted pair cabling but the concepts and techniques described are not limited to a specific network technology or topology; they can be implemented over alternate network technologies wired or unwired including common RF or IR or using any of the various fiber-optic technologies. The specific network infrastructure has no limitation on the concepts introduced by embodiments of the present invention.

In addition to providing a means of sharing a single physical network connection among several devices at a work center, the intelligent concentrator employed by this embodiment of the present invention, and the devices connected to it, could be powered over the same cabling that would be used for data communications. Multiplexing power to devices in this embodiment over the data lines eases deployment considerations by eliminating the need to locate a device next to an existing power source which may not be readily available. Another benefit of employing the same wiring and a central power feed is an increase in system reliability by eliminating service calls for times that the end user accidentally unplugs the system power. The ability to power devices over fiber-optic cabling is not precluded here. Indeed, some types of devices are currently capable of receiving power directly from a fiber-optic connection.

In addition to deployment in traditional office environments, a variant embodiment could be used in homes or areas of public transport, such as trains or airplanes to provide a secure and easy public access to network technology. Network administration needs in this scenario might include a means of charging a public user for network access time, automatically.

Also, as power requirements for computing devices continues to decline, it is envisioned that power to enable a portable computer to function could be provided or supplemented by means enabled by this embodiment of the present invention, allowing for a longer operating time. This could be especially valuable in the setting of an airplane where the wiring burden to provide for data and power could be eased by employing a single connection resulting in a saving in weight & space required to provide for connections for large numbers of users (e.g. one per seat). This invention could extend power over Ethernet schemes by providing for the fanning out of the power. Individual devices connected to a network using this embodiment of the present invention receive power from the same central source but could be isolated from each other by means of protective circuitry that would prevent a fault on one leg from impacting a device connected to another leg.

The foregoing descriptions of specific embodiments of the present invention have been presented for purposes of illustration and description. They are not intended to be exhaustive or to limit this embodiment of the present invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A computer network, comprising:
   one or more work centers, each comprising work center devices;
   one or more powered, intelligent, multiplexing devices located at one or more of said work centers, said powered, intelligent, multiplexing devices communicatively coupled with said work center devices via cabling, said one or more powered, intelligent, multiplexing devices providing an access control point, said one or more powered, intelligent, multiplexing devices further automatically providing a tamper alert signal to a network management source in the event of a physical breach;
   one or more network servers, each connected with one or more of said powered, intelligent, multiplexing devices, each connection via a single industry standard communications cable, wherein signals between said work center devices and said network servers are multiplexed in said cabling and said single industry standard communications cable; and
   one or more network administrator consoles, each network administration console implementing and managing said access control point of said one or more powered, intelligent, multiplexing devices.

2. The computer network described in claim 1, wherein said powered, intelligent, multiplexing devices are fixedly located at said work centers.

3. The computer network described in claim 1 wherein said work center devices comprise computers.

4. The computer network described in claim 1 wherein said work center devices comprise computer peripheral devices.

5. The computer network described in claim 1 wherein said work center devices comprise voice telephones.

6. The computer network described in claim 1 wherein said powered, intelligent, multiplexing devices are enabled to be coupled wirelessly to said work center devices.

7. The computer network described in claim 1 wherein said industry standard communications cabling is fiber-optic cabling.

8. The computer network described in claim 1 wherein said industry standard communications cabling is wire cabling.

9. A method for managing a computer network, wherein said computer network comprises one or more network servers and one or more work centers, said method comprising:

a) providing one or more powered, intelligent, multiplexing device connectors, at one or more of said work centers, each of said one or more powered, intelligent, multiplexing connectors providing a connection to one of said network servers via a single industry standard communications cable, said one or more powered, intelligent, multiplexing connectors further providing an access control point, said one or more powered, intelligent, multiplexing devices further automatically providing a tamper alert signal to a network management source in the event of a physical breach;
   b) electronically coupling two or more network devices to said powered, intelligent, multiplexing device connector;
   c) multiplexing signals between said network and said network devices;
   d) monitoring the status of the infrastructure of said network; and,
   e) communicating information of said status of said infrastructure to a management of said network, said management comprising one or more network administrator consoles, each network administration console implementing and managing said access control point of said one or more powered, intelligent, multiplexing devices.

10. The method described in claim 9 wherein said step of providing one or more powered, intelligent, multiplexing device connectors is accomplished, by fixedly locating said powered, intelligent, multiplexing device connectors at said work centers.

11. The method described in claim 9, wherein said step of electronically coupling two or more network devices to said powered, intelligent, multiplexing device connector is accomplished with modular cable connectors.

12. The method described in claim 9, wherein said step of electronically coupling two or more network devices to said powered, intelligent, multiplexing device connector comprises electronically coupling computers.

13. The method described in claim 9, wherein said step of electronically coupling two or more network devices to said powered, intelligent, multiplexing device connector comprises electronically coupling computer peripheral devices.

14. The method described in claim 9, wherein said step of electronically coupling two or more network devices to said powered, intelligent, multiplexing device connector comprises electronically coupling voice telephones.

15. The method described in claim 9, wherein said step of multiplexing signals is capable of multiplexing network data signals.

16. The method described in claim 9, wherein said step of multiplexing signals is capable of multiplexing device power.

17. The method described in claim 9, wherein said step of multiplexing signals is accomplished in said powered, intelligent, multiplexing device connectors.

18. The method described in claim 9, wherein said step of monitoring the status of the infrastructure of said network is accomplished in part by the use of circuitry resident in said powered, intelligent, multiplexing device connectors.

19. The method described in claim 9, wherein said step of communicating information of the status of said infrastructure of said network is accomplished in part by the use of circuitry resident in said powered, intelligent, multiplexing device connectors.

* * * * *